Patented Dec. 11, 1934

1,984,178

UNITED STATES PATENT OFFICE 1,984,178

VITREOUS MATERIAL AND PROCESS OF MAKING SAME

Philip K. Devers, Lynn, Mass., assignor to General Electric Company, a corporation of New York No Drawing. Application January 27, 1932, Serial No. 589,310

5 Claims. (Cl. 106—12)

The present invention comprises an improved vitreous material which consists mainly of silica and contains as elementary constituents beryllium and aluminum whereby the physical properties of the silica are modified and improved.

The physical properties of fused silica, (also known as vitreous silica), render it particularly applicable for use for various industrial purposes. For example, because of its low coefficient of expansion, high melting point, high dielectric strength, and chemical stability, vitreous silica is adapted as insulator material in the manufacture of spark plugs for internal combustion engines. Heretofore the brittleness of silica has been a draw-back which has restricted its use.

As a result of my present invention I have produced a vitreous material having greater tensile strength, compressive strength, and shock resistance than silica, while having other desirable properties of silica in substantially equal or enhanced degree.

In accordance with my invention these results are obtained by associating fused silica with the oxides of beryllium and aluminum, for example, by producing a fusion consisting of silica and the mineral beryl. The proportion of the beryl in the fusion, as will be hereinafter more fully explained, should be within the limits which will cause the product to have essentially the properties of fused or vitreous silica.

On accordance with one mode of carrying out my invention crystalline quartz ($SiO_2$) and the mineral beryl ($Al_2Be_3Si_6O_{18}$) are separately comminuted so as to pass through a sieve of about 190 to 350 meshes per square inch. In some cases a sieve as fine as 1000 meshes to the square inch may be used to advantage. The powdered silica and the powdered beryl are mixed in desired proportions, which should fall within the range of about 1 to 10 parts of beryl to 99 to 90 parts of silica by weight. I find about 3 to 5% of beryl by weight in the unfused mixture gives good results.

If desired, some aluminum oxide may be added to the silica-beryl mix in order to render the product more readily workable. I prefer to employ a mineral beryl in which the beryllium oxide, (BeO) constituent constitutes approximately 12 per cent of the weight of the mineral. In some cases beryllium oxide and aluminum oxide unassociated as beryl may be employed as addition products for silica fusions. Whatever source of beryllium and aluminum as elementary constituents in compound form is chosen the silica content should preponderate, the combined weight of the oxides of beryllium and aluminum being but a few per cent or even less than one per cent. The proportions I have employed to produce the present new vitreous product are a mixture containing about ⅕ to 2 per cent of alumina and about ½ to 1½ per cent of beryllia, the remainder being silica.

The mixture is fused in a suitable electric furnace, as for example the electric furnace described in my prior U. S. Patent 1,536,821, patented May 5, 1925, or the furnace described in Watson U. S. Patent 1,621,446, patented May 15, 1927. When a furnace of the core resistor type is employed as described in the Watson patent, I prefer to evacuate the furnace and to vent gases from the interior of the fusion charge as described in my prior U. S. Patent 1,862,358, patented June 7, 1932.

When the mixture has been thoroughly fused its transparency is comparable to high grade pure fused silica. The product has a dielectric strength at least equal to or higher than fused silica and has a tensile strength and shock resistance materially higher than unmodified fused silica.

The physical strength of the product is materially improved when subjected to a prolonged heat treatment at approximately its softening temperature which is about 1700° C., or at a higher temperature above the softening point. This heat treatment may be carried out after the fused mass has been converted into rods or tubes or after it is formed into insulators, or other articles of predetermined shape.

The mineral beryl as found in nature is associated with a considerable amount of combined gas, mostly hydrogen, which is given off during the fusion of the silica-beryl mixture. To the best of my knowledge the evolution of the hydrogen during the fusion of the mixture helps free the fusion from contaminating gases and other impurities and plays an important part in clearing up the mass.

The tensile strength of clear, fused silica is in the neighborhood of about 6,900 to 7,000 pounds per square inch. The tensile strength of the silica-beryl fused product has been found to be over 12,000 pounds per square inch. The silica-beryl after fusion in accordance with my invention has a materially higher rupture strength under compression than fused silica. The modulus of elasticity of my new product is about the same as that of unmodified fused silica.

As above indicated, the tensile strength of the beryl-silica mixture is increased by heat treatment and therefore working of the material in a flame during the fabrication of insulators or other objects therefrom results in an increase of tensile strength.

One of the most noteworthy properties of fused silica is the fact that it does not crack when subjected to sudden chilling. A mass of silica when quickly heated by a high temperature flame to surface fusion, the interior still being materially below plasticity, may be plunged into cold water without causing it to break. However, during such abrupt temperature changes surface cracks tend to form in the fused silica. These surface cracks may eventually lead to failure. When the fused product made from a silica-beryl mixture in accordance with my invention, is subjected in the same way to sudden thermal shock it does not develop surface cracks nearly so readily.

The advantages of the fused silica-beryl product may be summed up as follows: It has a tensile strength which is about 80% higher than fused silica. It is more readily workable in a flame than silica. It has a higher dielectric strength than silica. It is practically as clear, or capable of transmitting light, and substantially as elastic, as pure fused silica. It tends to toughen with long working in the flame and does not readily surface crack when subjected to sudden changes in temperature.

The fused silica-beryl may be fabricated into insulators for spark plugs, capsules for fire extinguishers, or other industrial devices by the methods employed for fabricating such devices from fused silica.

What I claim as new and desire to secure by Letters Patent of the United States is:

1. An insulating composition having essentially the properties of fused silica but being characterized by improved workability when plastic and decreased brittleness, said composition consisting mainly of silica and containing as constituents about $\frac{1}{2}$ to $1\frac{1}{2}$ per cent of beryllium oxide and about $\frac{1}{5}$ to 2 per cent of aluminum oxide.

2. A composition for making vitreous material by fusion thereof consisting by weight of about 90 to 99 parts silica and about 10 to 1 parts beryl.

3. The method of making a vitreous material which consists in fusing a finely divided mixture of the oxides of silicon, beryllium and aluminum, the combined weight of the beryllium and aluminum oxides forming about 3 to 5 per cent of the total amount.

4. A material having higher tensile strength and shock resistance than pure fused silica, but otherwise having substantially the properties of fused silica and consisting of a fused mixture of 3 to 5% by weight of beryl, and 97 to 95% by weight of silica.

5. A vitreous material consisting mainly of silica and containing as constituents about $\frac{1}{2}$ to $1\frac{1}{2}$ per cent of beryllium oxide and about $\frac{1}{5}$ to 2 per cent of aluminum oxide.

PHILIP K. DEVERS.